United States Patent
Kraft et al.

(10) Patent No.: US 6,862,713 B1
(45) Date of Patent: Mar. 1, 2005

(54) INTERACTIVE PROCESS FOR RECOGNITION AND EVALUATION OF A PARTIAL SEARCH QUERY AND DISPLAY OF INTERACTIVE RESULTS

(75) Inventors: Reiner Kraft, Gilroy, CA (US); W. Scott Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/387,668

(22) Filed: Aug. 31, 1999

(51) Int. Cl.[7] .......................... G06F 3/00; G06F 17/30; G06F 3/16

(52) U.S. Cl. ..................... 715/728; 715/700; 715/864; 715/968; 715/978; 704/246; 704/248; 704/251; 704/253; 707/3

(58) Field of Search ................................ 345/700, 727, 345/728, 780, 968, 978, 864, 865; 704/4, 9, 231, 236, 246, 251, 211, 221, 248, 253, 243; 707/3–6, 104.1

(56) References Cited

U.S. PATENT DOCUMENTS

| | | | |
|---|---|---|---|
| 4,689,768 A | | 8/1987 | Heard et al. ................. 707/533 |
| 5,175,814 A | * | 12/1992 | Anick et al. ................. 704/9 X |
| 5,278,980 A | * | 1/1994 | Pedersen et al. ............... 707/4 |
| 5,305,205 A | | 4/1994 | Weber et al. ................ 707/531 |
| 5,404,507 A | | 4/1995 | Bohm et al. .................... 707/4 |
| 5,410,692 A | | 4/1995 | Torres ........................... 707/3 |

(List continued on next page.)

FOREIGN PATENT DOCUMENTS

| | | | | |
|---|---|---|---|---|
| WO | WO 89/04035 | * | 5/1989 | ............. G01L/5/06 |

OTHER PUBLICATIONS

"Folio VIEWS", Soft–Art, Inc. and Linguistic Software Products, Inc., Version 3.11.4, 1994.*

"Pocket Guide to DIALOG", Mar. 1991, Diagog, p. 3.*

Aoife McEvoy, "Speech Recognition", Mar. 1999, PC World 17, 3, 88 (1).*

Barry Nance, "Internal Search Engines Get You Where You Want To Go", Oct. 1997, Network Computing, p. 104.*

Sougata Mukherjea et al, "Visualizing World–Wide Web Search Engine Results", Jul. 1999, IEEE, pp. 400–405.*

Makoto Katsuura et al, "The WWW Browser System with Spoken Keyword Recognition", Feb. 1999, Journal: Transactions of the Information Processing Society of Japan, vol. 40, No. 2, pp. 443–452.*

Raymond Lau et al, "WebGALAXY: Beyond Point and Click—A Conversational Interface to a Browser", Sep. 1997, Elsevier, vol. 29, No. 8–13, pp. 1385–93.*

Bo–Ren Bai et al, "Intelligent Retrieval of Dynamic Networked Information From Mobile Terminals using Spoken Natural Language Queries", Feb. 1998, IEEE, vol. 44, No. 1, pp. 62–72.*

Automated Patent Search Results.

*Primary Examiner*—X. L. Bautista
(74) *Attorney, Agent, or Firm*—Jon A. Gibbons; Fleit, Kain, Gibbons, Gutman, Bongini & Bianco P.L.

(57) ABSTRACT

A method for presenting to an end-user the intermediate matching search results of a keyword search in an index list of information. The method comprising the steps of: coupling to a search engine a graphical user interface for accepting keyword search terms for searching the indexed list of information with the search engine; receiving one or more keyword search terms with one or more separation characters separating there between; performing a keyword search with the one or more keyword search terms received when a separation character is received; and presenting the number of documents matching the keyword search terms to the end-user, and presenting a graphical menu item on a display. In accordance with another embodiment of the present invention, an information processing system and computer readable storage medium carries out the above method.

26 Claims, 5 Drawing Sheets

U.S. PATENT DOCUMENTS

| | | | |
|---|---|---|---|
| 5,696,964 A | | 12/1997 | Cox et al. .................... 707/5 |
| 5,704,060 A | * | 12/1997 | Del Monte ............. 707/104.1 |
| 5,798,757 A | | 8/1998 | Smith ....................... 345/709 |
| 6,070,158 A | * | 5/2000 | Kirsch et al. ................ 707/3 |
| 6,246,976 B1 | * | 6/2001 | Mukaigawa et al. .......... 704/9 |
| 6,278,990 B1 | * | 8/2001 | Horowitz ..................... 707/3 |
| 6,345,252 B1 | * | 2/2002 | Beigi et al. ............ 704/251 X |
| 6,377,927 B1 | * | 4/2002 | Loghmani et al. ......... 704/275 |
| 6,424,357 B1 | * | 7/2002 | Frulla et al. ............... 345/728 |
| 6,434,527 B1 | * | 8/2002 | Horvitz ..................... 704/275 |
| 6,499,013 B1 | * | 12/2002 | Weber ...................... 704/257 |
| 6,519,600 B1 | * | 2/2003 | Siefert ....................... 707/10 |
| 6,567,797 B1 | * | 5/2003 | Schuetze et al. .............. 707/2 |

\* cited by examiner

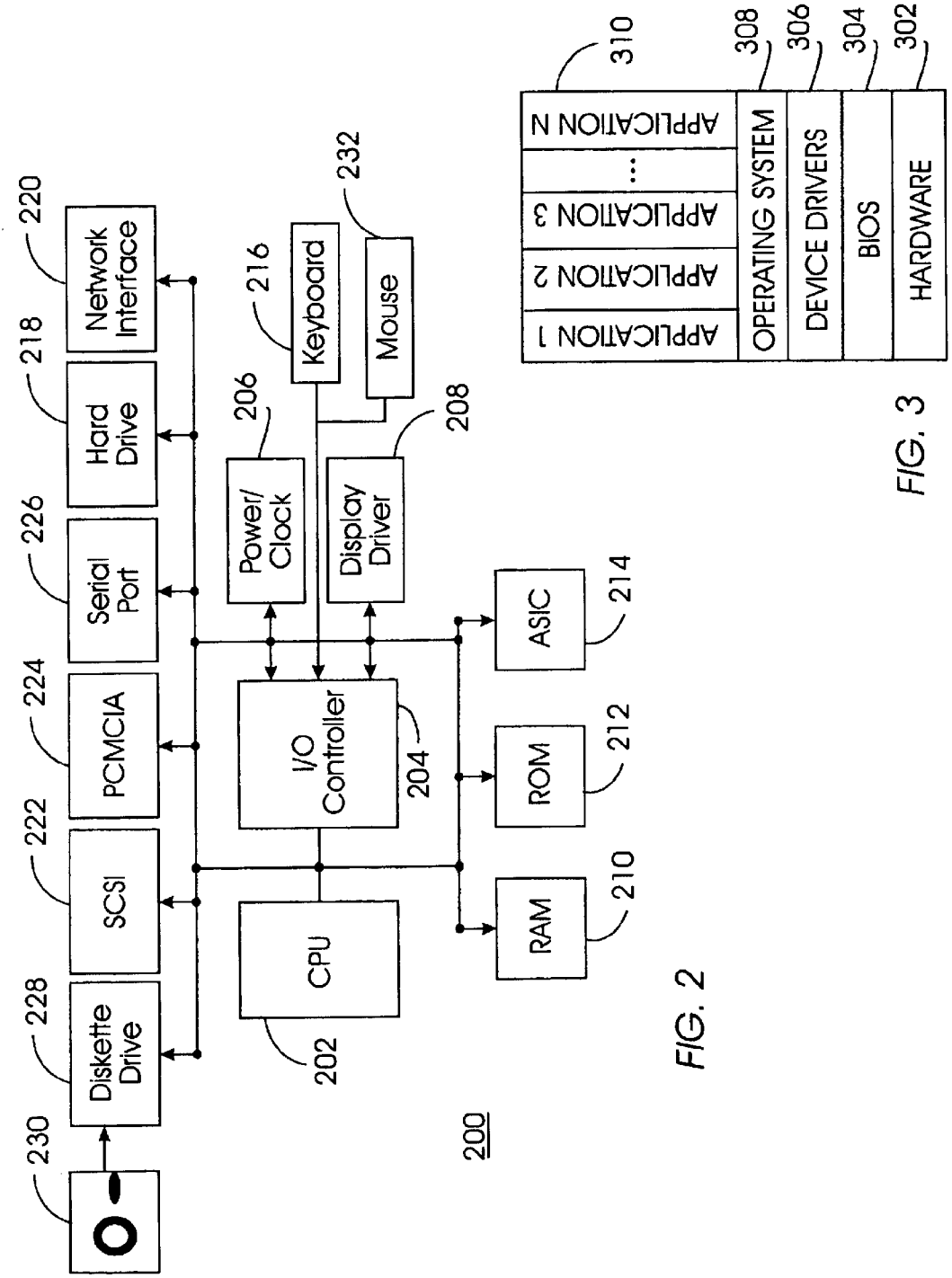

FIG. 5C

Keyword Search

Enter keyword search for virus excel — 516

30 matching examples (0.24%)

Show Examples | OK

Search

FIG. 5D

Keyword Search

Enter keyword search for virus excel keyboard — 518

0 matching examples (0.00%) — 512

Show Examples | OK

Search

INTERACTIVE PROCESS FOR RECOGNITION AND EVALUATION OF A PARTIAL SEARCH QUERY AND DISPLAY OF INTERACTIVE RESULTS

CROSS-REFERENCE TO RELATED APPLICATIONS

Not applicable

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The invention disclosed broadly relates to the field of computers computing, and more particularly relates to the menu items in the field of graphical user interfaces.

2. Description of the Related Art

The World-Wide-Web ("Web") has become immensely popular largely because of the ease of finding information and the user-friendliness of today's browsers. A feature known as hypertext allows a user to access information from one Web page to another by simply pointing (using a pointing device such as a mouse) at the hypertext and clicking. Another feature that makes the Web attractive is having the ability to process the information (or content) in remote Web pages without the requirement of having a specialized application program for each kind of content accessed. Thus, the same content is viewed across different platforms. Browser technology has evolved to enable the running of applications that manipulate this content across platforms.

The Web relies on an application protocol called HTML (Hyper-Text Mark Up Language), which is an interpretative scripting language, for rendering text, graphics, images, audio, real-time video, and other types of content on a Web compliant browser. HTML is independent of client operating systems. Therefore, HTML renders the same content across a wide variety of software and hardware operating platforms. The software platforms include without limitation Windows 3.1, Windows NT, Apple's Copeland and Macintosh, and IBM's AIX and OS/2, and HP Unix. Popular compliant-Web-Browsers include without limitation Microsoft's Internet Explorer, Netscape. Navigator, Lynx, and Mosaic. The browser interprets links to files, images, sound clips, and other types of content through the use of hypertext links.

A Web site is a related collection of Web files that includes a beginning file called a home page. A Web site is located a specific URL (Uniform C Resource Locator). Web site usually start with a home page from which a user can link to other pages. Online URL ibm.com is one example of a home page.

Users of the Web use tools to help find, location or navigate through the Web. These tools are known as Internet search engines or simply search engines. Almost all search engines provide graphical user interfaces (GUIs) for boolean and other advanced search techniques from their private catalog or database of Web sites. The technology used to build the catalog changes from site to site. The use of search engines for keyword searches over an indexed list of documents is a popular solution to the problem of finding a small set of relevant documents in a large, diverse corpus. On the Internet, for example, most search engines provide a keyword search interface to enable their users to quickly scan the vast array of known documents on the Web for the handful of documents which are most relevant to the user's interest.

There are several examples of search engines including tools called Internet search engines or simple search engines Yahoo (yahoo.com), AltaVista (altavista.com), HotBot (hotbot.com), Infoseek (infoseek.com), Lyrcos (lycos.com) WebCrawler (webcrawler.com) and others. The results of a search are displayed to a user in a hierarchically-structured subject directory. Some search engines give special weighting to words or keywords: (i) in the title; (ii) In subject descriptions; (iii) listed in HTML META tags, (iv) in the position first on a page; and (iv) by counting the number of occurrences or recurrences (up to a limit) of a word on a page. Because each of the search engines uses a somewhat different indexing and retrieval scheme, which is likely to be treated as proprietary information. Refer to online URL whatis.com for more information on search engines.

In its simplest form, the input to keyword searches in a search engine is a string of text that represents all the keywords separated by spaces. When the "search" button is selected by the user, the search engine finds all the documents which match all the keywords and returns the total number that match, along with brief summaries of a few such documents. There are variations on this theme that allow for more complex boolean search expressions.

Although these search engines are useful, they are not without their shortcomings. One shortcoming is that for many popular search requests a very large number of search results are returned. For example number of matches found for the search of the keyword "virus" on the AltaVista search engine returned 1,721,110 Web pages. This large number of return pages makes use these search results unwieldily. And because the Web is recently reported to be growing at a rate of more than one million new Web pages per day, this large number of returned Web pages is only expected to increase in time. To proper prune down the number of search results, more keywords and search criteria are added. Returning to the example of the keyword "virus", the search results from AltaVista search engine of 1,721,110 Web pages are narrowed down to 16 Web pages with the phrase "Microsoft excel macro virus", which is much more manageable for a user. Accordingly, a need exists to provide users of search engines intermediate search results to assist in properly narrowing keyword searching.

Another problem with these search engines is the point at which information is returned to a user. It is common for search engines to provide feedback to the user only when the "search" button is pressed and the matching document summarizations are displayed. For many cases the keyword search strings provided by the user give a result having either too many matches or too few (e.g., zero) for the user's requirements. The user then has to repeat the search by adding or deleting keywords. Several iterations may be necessary and the process is often inefficient and time consuming. Accordingly, a need exists to overcome these shortcomings.

SUMMARY OF THE INVENTION

Briefly, in accordance with the present invention, a method for presenting to an end-user the intermediate matching search results of a keyword search in an index list of information. The method comprising the steps of: coupling to a search engine a graphical user interface for accepting keyword search terms for searching an indexed list of information with a search engine; receiving one or more keyword search terms with one or more separation characters separating there between; performing a keyword search with the one or more keyword search terms received when a separation character is received; and presenting the number of documents matching the keyword search terms to the end-user. And, presenting a graphical menu item on a display.

In accordance with another embodiment of the present invention, an information processing system and computer readable storage medium is disclosed for carrying out the above method.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 2 is a functional block diagram of a data processing system of Web server for hosting Web pages.

FIG. 3 is a block diagram of the major electrical components of a Web server of FIG. 2 according to the present invention.

FIGS. 5A–5D is a series of illustrations of a screen display of the intermediate search results corresponding to the flow diagram of FIG. 4 according to the present invention.

DETAILED DESCRIPTION OF AN EMBODIMENT

An Embodiment of the Hardware and Software Systems

Figure 1:
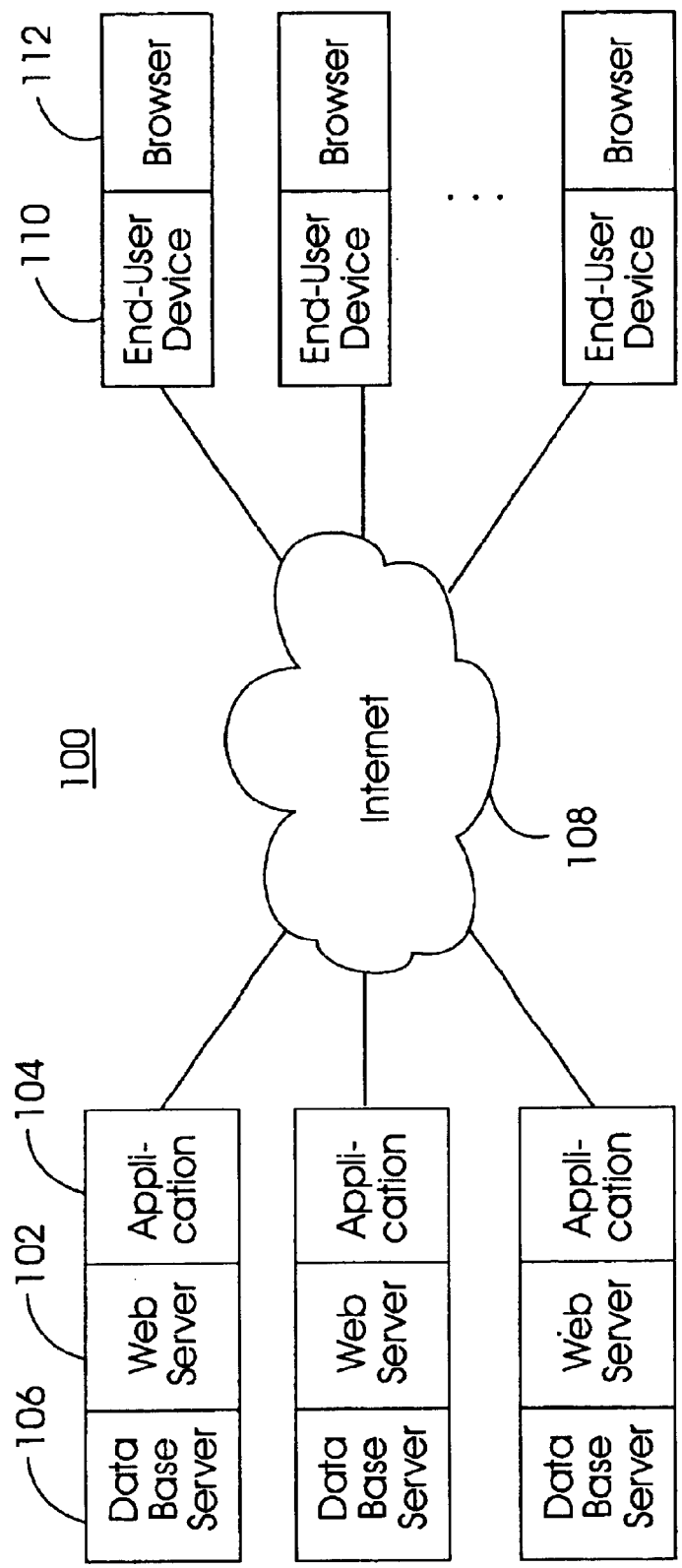
FIG. 1 is a functional block diagram of a client-server system for hosting Web pages, according to the present invention.

Referring now in more detail to the drawings in which like numerals refer to like parts throughout several views, FIG. 1 depicts a functional block diagram of a client-server system 100 for hosting Web pages, according to the present invention. A Web server 102 running a Web server application 104 and coupled to a data base server 106. The Web server 102 can be an IBM compatible computer capable of running any HTTP (Hyper-Text-Transfer-Protocol) compatible server software such as Netscape Web server products or equivalent. The Web server 102 is connected to the Internet 108. An end user data processing device 110 with Web browser 112 is connected to the Internet 108 or other computer network. The Web browser 112 can be any HTTP compatible product such as Netscape Navigator, Sun Hot Java Browser, Microsoft Internet Explorer or equivalent. It is important to point out that the precise operating systems and hardware configurations of the database server 106, the Web server 101, the end user device 110 and the Web-browser 112 are not limited to any specific hardware or software configuration. These systems can be implemented on a wide variety of hardware and software platforms.

The search engine application 104 provides searching services running on the Web server 102 for listing information stored on database server 106 to be rendered over Internet 108 on Web browser 112. The listing information stored on the database server 106 are multimedia files for rendering over the Internet 108. Unlike other database systems used for searching, the multimedia files in the present invention are not related to speech recognition grammars and natural language processing databases as used in speech recognition. An end user has the ability to enter desired search criteria into the application 103. The Web browser 112 through Internet 108, communicates with the Web server 102 to query the database server 106. The results of the search from database server 106 are then sent back, through the Web server 102 and over the Internet 108, to the end user browser 112.

FIG. 2, shows a block diagram of the major electrical components 200 of a Web server 102 of FIG. 1 used in accordance with this invention. The electrical components include: a central processing unit (CPU) 202, an Input/Output (I/O) Controller 204, a system power and clock source 206; display driver 208; RAM 210; ROM 212; ASIC (application specific integrated circuit) 214 and a hard disk drive 218. A keyboard 216 with a mouse 232 receives the end-user input. These are representative components of a computer. The operation of a computer comprising these elements is well understood. Network interface 220 provides connection to a computer network such as Ethernet, TCP/IP or other popular protocol network interfaces. Optional components for interfacing to external peripherals include: a Small Computer Systems Interface (SCSI) port 222 for attaching peripherals; a PCMCIA slot 224; and serial port 226. An optional diskette drive 228 is shown for loading or saving code to removable diskettes 230 or equivalent computer readable media such as CD-ROM, removable storage medium and optical character scanning. The system 200 may be implemented by combination of hardware and software. Moreover, the functionality required for using the invention may be embodied in computer-readable media (such as 3.5 inch diskette 230) to be used in programming an information-processing apparatus (e.g., a personal computer) to perform in accordance with the invention.

FIG. 3 is a block diagram illustrating the software hierarchy for the information processing system of FIG. 2 according to the present invention. The hardware 302 is the information processing system of FIG. 3. BIOS (Basic Input Output System) 304 is a set of low level computer hardware instructions, usually stored in ROM 312, for communications between an operating system 308, device driver(s) 306 and hardware 302. Device drivers 306 are hardware specific code used to communicate between and operating system 308 and hardware peripherals such as a mouse 332, CD ROM drive or printer. Applications 310 are software applications written in C/C++, Java, assembler or equivalent. Operating system 408 is the master program that loads after BIOS 404 initializes, that controls and runs the hardware 402. Examples of operating systems include DOS, Windows 3.1/95/98/NT, Unix, Macintosh, OS/2 and equivalent. The functionality on the present invention can be part of the search engine application 104 or as an application 310 separate from the search engine application 104.

Although this embodiment has shown a client-server-based implementation for a search engine, in another embodiment, the search engine is searching a database on a local information processing system, such as a database on a CD ROM and the teachings of this present invention operate in this standalone implementation as well.

An Embodiment of the Process Flow

The overview of the process is first described, followed by a flow diagram of the process flow and finally, several screen illustrations of the application 310 implemented in the Java programming language are described. The overview of the process is the presentation of intermediate results to end-users as they enter their search query. As the query string is typed into the keyword entry box, individual keywords are recognized by a separation character delimiter. As soon as the separation character is received, the partial keyword string is sent to the search engine for processing. The resulting number of matching documents is then displayed for the user as the user continues typing the rest of the query string. The user thus has immediate feedback as to how narrowly focused the query string is over the indexed list of all documents and can make adjustments as the user goes. Once the user sees that the search string entered has become sufficiently exact, the user can ask the search engine to show all matching example summaries.

Figure 4:
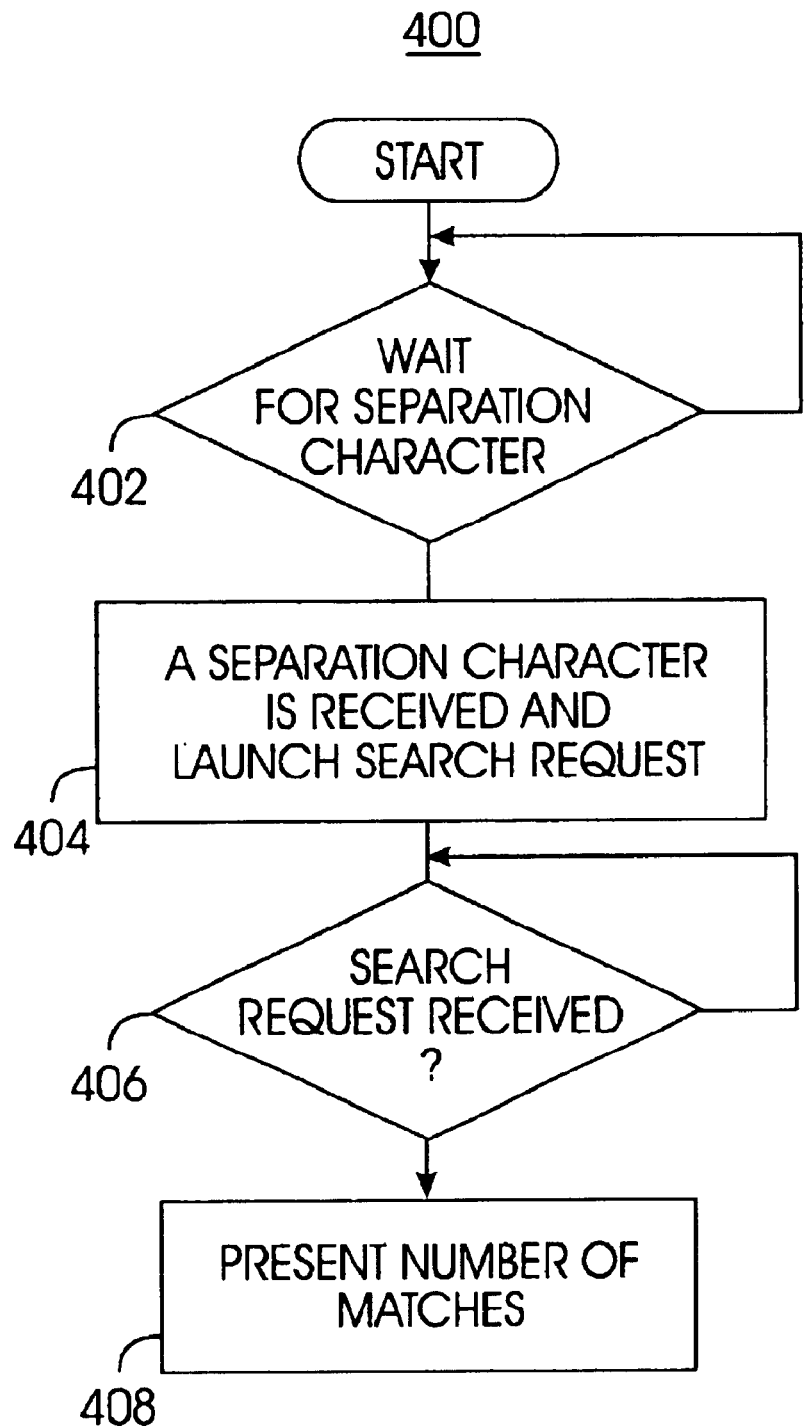
FIG. 4 is a flow diagram of the partial result presentation according to the present invention.

Turning now to FIG. 4 is a flow diagram of the partial result presentation according to the present invention. The process begins with the application 3xx waiting for a separation character, step 402. In this embodiment the separation character is the space character, but any other keyboard character or deliminator may be used. Once the separation character or SPACE key is received, a search request is sent to the search engine application 310, step 404. The search engine application 310 returns the results of the search, step 406 and the number of search matches are presented, step 408. This sequence is illustrated in FIGS. 5A–5D below.

Figure 5A:
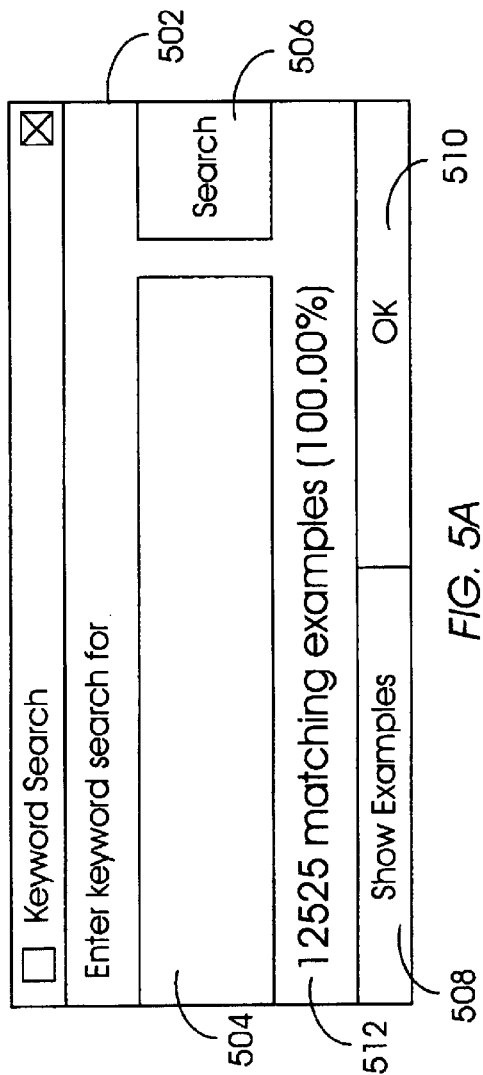
Figure 5B:
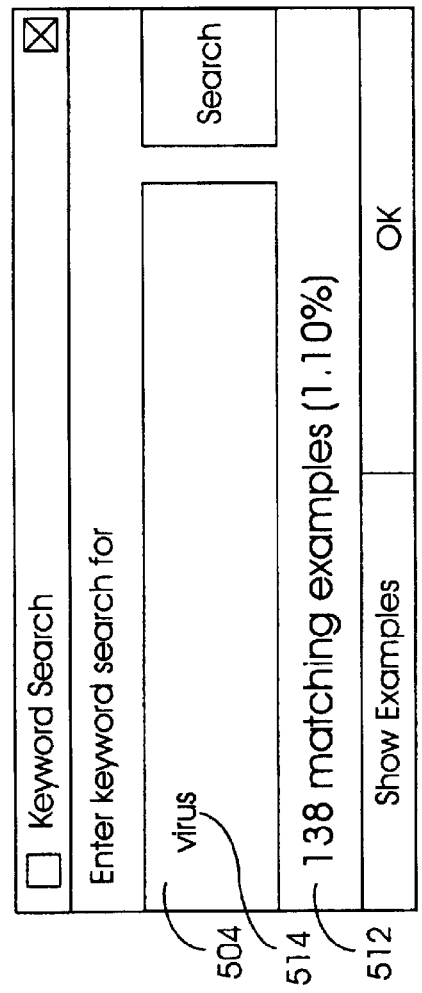

Referring now to FIGS. 5A–5D, depicted is a series of illustrations of a screen display 500 of the intermediate search results corresponding to the flow diagram of FIG. 4 according to the present invention. In FIG. 5A, shown is a user search dialog box 502 with an entry field 504, search button 506, a help key labeled "SHOW EXAMPLES" 508 and a close key labeled "OK", 510. The number of records matching the keyword search for the indexed list thus far is presented 512. In this example the dialog box 502 presents to the user that 12,525 documents match the keyword search. As the user begins to type in his search string, the system looks for occurrences of the separation character. In this example, the separation character is the SPACE character in the entry field 504. As illustrated in FIG. 5B, when the SPACE character is detected by application 310, the application 310 launches a keyword search, consisting of all the keywords typed so far, in this example the word "virus", 514. The results found thus far from the keyword search of "virus" are displayed 512, "138 matching examples (1.10%)" along with an optional percentage 1.10% of the matches found over the entire available index list of documents. The user immediately receives feedback about how many documents in the index list contain the keyword "virus." Since there are still many documents that match the keyword search (i.e. 138), the user continues typing additional keywords. Note that the user was not forced to click on a search button 506 nor was any extraneous information produced such as summaries of the documents presented on display at this point. Only the necessary information concerning the narrowness of the search query is displayed.

In FIG. 5C, the next time a SPACE character is entered is after the keyword "excel" has been typed. The user can quickly determine that there are only 30 documents, 512, containing the keywords "virus excel", 516.

Continuing to FIG. 5D, the user decides to add a third keyword to narrow the focus even further. At this point the user discovers there are no documents (.e., zero), 512, that match the keywords "virus excel keyboard", 518 from the indexed list. At this point the user can either choose a different keyword to enter other than "keyboard" or simply go back to having only two keywords and look at the documents that matched "virus excel" in FIG. 5C.

In another embodiment, the text input in entry field 504 is received by the user's voice with a speech to-text-application running to enter the user's spoken keywords, such as IBM ViaVoice Speech Recognition Engine. The deliminators between the words can be inserted through several different mechanisms. One mechanism is to parse the spoke words based on non-vocalized patterns known in the art of speech recognition, such as periods of silence. Another method is to automatically interject character deliminators in between keyword search terms through the use of a timer. The use of a time delay is selectable by the user. This speech to text embodiment is particularly useful in hands free applications such as PDAs, PIMS and cell phones where the user wishes to keyword search an indexed database with voice. In addition, a text-to-speech engine, such as IBM's Eloquent Technology, may be used to present the results an audio message to an end-user concerning the number of documents, 512, that match a keyword search. Although, the insertion of deliminators by a time delay Is disclosed for speech input, the use of time delay for keyboard entry into entry field 504 is useful as well.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for presenting to an end-user the intermediate matching search results of a keyword search in an index list of information comprising the steps of:

coupling to a search engine executing on a webserver, a graphical user interface for accepting keyword search terms for searching the indexed list of information, wherein the information is multimedia files not related to speech recognition grammars and natural language processing databases as used in speech recognition;

receiving one or more keyword search terms with one or more separation characters separating there between from the end-user;

performing a keyword search with the one or more keyword search terms received after each separation character is received from the end-user; and presenting a number of documents matching the keyword search terms to the end-user without providing additional information regarding the documents matching the keyword search thereby providing feedback on a narrowness of just the keyword search terms received thus far; wherein the step of receiving includes receiving one or more separation characters that are the space character using the end-user's voice and a speech-to-text engine.

2. The method according to claim 1, wherein the step of presenting includes presenting the number of matches to the end-user with audio using a text-to-speech engine.

3. The method according to claim 1, further comprising the step of:

receiving a category from the end-user for performing the keyword search.

4. The method according to claim 1, further comprising the step of:

receiving one or more boolean connecting criteria for performing the key word search.

5. A method for presenting to an end-user the intermediate matching search results of a keyword search in an index list of information comprising the steps of:

a) coupling to a search engine executing on a webserver, a graphical user interface for accepting keyword search terms for searching the indexed list of information, wherein the information is multimedia files not related to speech recognition grammars and natural language processing databases as used in speech recognition;

b) waiting to receive one or more keyword search terms with one or more predefined separation characters separating there between;

c) identifying if one or more predefined separation characters are received and performing a keyword search with the one or more keyword search terms received in response to receiving each separation character;

d) presenting a number of matches to the keyword search of the indexed list to the end-user without providing additional information regarding the documents matching the keyword search thereby providing feedback on a narrowness of just the keyword search terms received thus far; and e) repeating steps b through d above until the end-user terminates the keyword search, wherein the step of waiting further includes the sub-step of waiting a predetermined amount of time between keywords received and automatically inserting a predefined separation character after each keyword enter, once the predetermined amount of time elapsed.

6. The method according to claim 5, wherein the step of presenting includes presenting the number of matches to the end-user with audio using a text-to-speech engine.

7. The method according to claim 5, wherein the step of waiting to receive includes waiting to receive one or more keyword search terms with one or more predefined separation characters that is converted to text using a speech-to-text engine from an end-user's voice input.

8. The method according to claim 7, wherein the step of waiting to receive includes waiting to receive predefined separation characters that are converted from the end-user's voice during periods of silence between spoken keyword terms.

9. A method for searching a database and presenting intermediate search results with a voice interface comprising the steps of:

receiving a spoken input from a user having a first portion of a search request;

searching the spoken input for a predefined delimiter;

performing a search of the database on webserver with the first portion of the search request in response to the predefined delimiter, wherein the database contains multimedia files not related to speech recognition grammars and natural language processing databases as used in speech recognition;

presenting an audio message to the user indicative of intermediate search results including a number of database records that match the first portion of the search request without providing additional information regarding the documents matching the keyword search thereby providing feedback on a narrowness of just the keyword search terms received thus far;

receiving a subsequent spoken input from the user for a subsequent portion of the search request;

performing a subsequent search of the database with the first and the subsequent portion of the search request; and presenting a second audio message to the user indicative of a subsequent search result having a second number of records that match the first and the subsequent portions of the search request without providing additional information regarding the documents matching the keyword search thereby providing feedback on a narrowness of just the keyword search terms received thus far.

10. The method according to claim 9 wherein said step of searching the spoken input for the predefined delimiter parses the spoken input for a word boundary based on non-vocalized patterns and wherein the predefined delimiter corresponds to the word boundary.

11. The method according to claim 9 wherein said step of searching the spoken input for the predefined delimiter parses the spoken input for word boundaries based on non-vocalized patterns and wherein the predefined delimiter corresponds to a time delay between the word boundaries.

12. The method according to claim 11 wherein the time delay is selectable by the user.

13. The method according to claim 11 wherein the non-vocalized patterns for determining word boundaries are shorter than the time delay, thereby providing for the first portion of the search request to include multiple spoken words.

14. The method according to claim 9 wherein said steps of receiving are performed on a telephone microphone and said steps of presenting are performed on a telephone speaker, thereby providing a hands free application that facilitates building a search request using a telephone.

15. The method according to claim 14 wherein the database corresponds to the Internet, thereby providing a hands free application that facilitates building a search request of Internet records using a telephone.

16. The method according to claim 14 wherein the telephone is a cell phone, thereby providing a mobile hands free application that facilitates building a search request Internet records using a mobile telephone.

17. The method according to claim 9 wherein said steps of receiving are performed on a microphone and said steps of presenting are performed on a speaker coupled to a Personal Digital Assistant, a Personal Information Manager or a Personal Computer, and wherein the database corresponds to the Internet, thereby providing a hands free application that facilitates building a search request of Internet records using a Personal Digital Assistant, a Personal Information Manager or a Personal Computer.

18. The method according to claim 9 wherein said steps of receiving and searching are performed using a speech-to-text engine, said steps of performing are performed using a text search engine which generates text results, and said steps of presenting are performed using a text-to-speech engine.

19. A method in a telephone for searching a database and presenting intermediate search results with a voice interface comprising the steps of:

receiving at a microphone of the telephone a spoken input having a first portion of a search request;

searching the spoken input for a predefined delimiter;

performing a search of the database on a webserver with the first portion of the search request in response to the predefined delimiter, wherein the database contains multimedia files not related to speech recognition grammars and natural language processing databases as used in speech recognition;

presenting at a speaker of the telephone an audio message indicative of intermediate search results including a number of database records that match the first portion of the search request without providing additional information regarding the documents matching the keyword search thereby providing feedback on a narrowness of just the keyword search terms received thus far;

receiving at the microphone a subsequent spoken input for a subsequent portion of the search request;

performing a subsequent search of the database with the first and the subsequent portion of the search request; and presenting at the speaker a second audio message indicative of a subsequent search result having a second number of records that match the first and the subsequent portions of the search request without providing additional information regarding the documents matching the keyword search thereby providing feedback on a narrowness of just the keyword search terms received thus far.

20. The method according to claim 19 wherein said step of searching the spoken input for the predefined delimiter parses the spoken inputs for a word boundary based on non-vocalized patterns and wherein the predefined delimiter corresponds to the word boundary.

21. The method according to claim 19 wherein said step of searching the spoken input for the predefined delimiter parses the spoken inputs for word boundaries based on non-vocalized patterns and the predefined delimiter corresponds to a time delay between the word boundaries, the time delay being longer than the non-vocalized patterns for determining the word boundaries, thereby providing for the a portion, of the search request to include multiple spoken words.

22. The method according to claim 19 wherein the telephone is incorporate within a Personal Digital Assistant, a Personal Information Manager or a Personal Computer, and wherein the database corresponds to the Internet, thereby providing a hands free application that facilitates building a search request of Internet records using a Personal Digital Assistant, a Personal Information Manager or a Personal Computer.

23. A method for searching records of a database having a record index and presenting intermediate search results with a voice interface comprising the steps of:

receiving a spoken input from a user having a first portion of a search request;

searching the spoken input for a predefined delimiter;

performing a search of the record index with the first portion of the search request in response to the predefined delimiter;

presenting an audio message to the user indicative of intermediate search results including a number of database records on webserver that match the first portion of the search request without providing additional information regarding the documents matching the keyword search thereby providing feedback on a narrowness of just the keyword search terms received thus far, wherein the database records contains multimedia files not related to speech recognition grammars and natural language processing databases as used in speech recognition;

receiving a subsequent spoken input from the user for a subsequent portion of the search request;

searching the subsequent spoken input for the predefined delimiter;

performing a subsequent search of the record index with the first and the subsequent portions of the search request in response thereto; and presenting a second audio message to the user indicative of a subsequent search result having a second number of records that match the first and the subsequent portions of the search request without providing additional information regarding the documents matching the keyword search thereby providing feedback on a narrowness of just the keyword search terms received thus far.

24. The method according to claim 23 wherein said steps of receiving and searching are performed using a speech-to-text engine, said steps of performing are performed using a text search engine which generates text results, and said steps of presenting are performed using a text-to-speech engine.

25. The method according to claim 23 wherein said step of searching the spoken input for the predefined delimiter parses the spoken inputs for word boundaries based on non-vocalized patterns and the predefined delimiter corresponds to a time delay between the word boundaries, the time delay being longer than the non-vocalized patterns for determining the word boundaries, thereby providing for the a portion of the search request to include multiple spoken words.

26. The method according to claim 23 wherein said steps of receiving and presenting are performed on a telephone microphone and speaker respectively, thereby providing a hands free application that facilitates building a search request for retrieval of database records using a telephone.

* * * * *